(12) United States Patent
Wang et al.

(10) Patent No.: US 12,474,011 B2
(45) Date of Patent: Nov. 18, 2025

(54) MULTI-FUNCTIONAL POLYOL BASED FIBER GLASS BINDER COMPOSITION

(71) Applicant: JOHNS MANVILLE, Denver, CO (US)

(72) Inventors: Lance Wang, Parker, CO (US); Kiarash Alavi, Littleton, CO (US); Guodong Zheng, Highlands Ranch, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 504 days.

(21) Appl. No.: 17/976,132

(22) Filed: Oct. 28, 2022

(65) Prior Publication Data

US 2024/0142040 A1 May 2, 2024

(51) Int. Cl.
| | |
|---|---|
| C08G 63/20 | (2006.01) |
| C08G 63/19 | (2006.01) |
| C08G 63/547 | (2006.01) |
| C08G 63/672 | (2006.01) |
| C08G 63/676 | (2006.01) |
| C08G 63/685 | (2006.01) |
| D04H 1/4218 | (2012.01) |
| D04H 1/587 | (2012.01) |
| D04H 3/004 | (2012.01) |

(Continued)

(52) U.S. Cl.
CPC ............ *F16L 59/026* (2013.01); *C08G 63/19* (2013.01); *C08G 63/20* (2013.01); *C08G 63/547* (2013.01); *C08G 63/672* (2013.01); *C08G 63/676* (2013.01); *C08G 63/6856* (2013.01); *C08G 63/6858* (2013.01); *D04H 1/4218* (2013.01); *D04H 1/587* (2013.01); *D04H 3/004* (2013.01); *D04H 3/12* (2013.01); *F16L 59/028* (2013.01); *D10B 2401/04* (2013.01); *D10B 2401/063* (2013.01)

(58) Field of Classification Search
CPC .................................. C08G 63/19; C08G 63/20
See application file for complete search history.

(56) References Cited

U.S. PATENT DOCUMENTS

2010/0242402 A1    9/2010  Briner et al.
2015/0061174 A1*   3/2015  Holmstrom ............. F02B 77/13
                                                      181/294

FOREIGN PATENT DOCUMENTS

EP        0 262 537 A2    4/1988
WO    WO-2012009609 A1 *  1/2012  ............. C09K 21/06

OTHER PUBLICATIONS

Bennett, Thomas M., John F. Allan, Jennifer A. Garden, and Michael P. Shaver. "Low formaldehyde binders for mineral wool insulation: a review." Global Challenges 6, No. 4 (2022): 2100110.*

* cited by examiner

*Primary Examiner* — Jeffry H Aftergut
(74) *Attorney, Agent, or Firm* — Robert D. Touslee

(57) ABSTRACT

A fibrous insulation product, such as a fibrous insulation blanket or board product, includes a plurality of fibers that are entangled together and a crosslinked aromatic polymeric binder that bonds the plurality of fibers together. The fibrous insulation product includes between 80 and 99 weight percent of the fibers and between 1% by weight and 20% by weight of the crosslinked aromatic binder. The fibrous insulation product has a density of between 0.4 and 6.0 pounds per cubic foot (pcf) and an R-value of between 4 and 50. The crosslinked aromatic polymeric binder has an aromaticity of greater than 10%.

27 Claims, 6 Drawing Sheets

(51) Int. Cl.
*D04H 3/12* (2006.01)
*F16L 59/02* (2006.01)

MULTI-FUNCTIONAL POLYOL BASED FIBER GLASS BINDER COMPOSITION

BACKGROUND

Fibrous insulation products are commonly used to insulate various structures, such as homes, buildings, plants, warehouses, and the like. Fibrous insulation products cover multiple insulations materials such as fibrous blankets and board products. The fibrous insulation products include one or more fibers (e.g., glass fibers, mineral wool, and the like) that are often bonded together to form the insulation product. A binder is often applied to loose fibers and is dried or cured to bond the fibers together. The fibrous insulation products are easily installed onsite and offer excellent insulation properties. The fibrous insulation products may include one or more filler materials or additives that provide improved functionality, such as fire retardancy, mold control, and the like.

BRIEF SUMMARY

The embodiments described herein relate to fibrous insulation products that include an aromatic polymeric binder that improves the thermal stability and mechanical properties of the fibrous insulation. According to one aspect, a fibrous insulation product includes a fibrous insulation blanket or board product having a plurality of fibers that are entangled together and a crosslinked aromatic polymeric binder that bonds the plurality of fibers together. The fibrous insulation blanket or board product has a length, a width, a thickness, a density of between 0.4 and 6.0 pounds per cubic foot (pcf), and an R-value of between 4 and 50. The crosslinked aromatic polymeric binder has an aromaticity of greater than 10%. The fibrous insulation product includes between 80 and 99 weight percent of the fibers and between 1% by weight and 20% by weight of the crosslinked aromatic binder.

The crosslinked aromatic polymeric binder may be a polyester and/or a nitrogen containing polyester. In other instances, the crosslinked polymeric binder is a polyacrylic binder. In some instances, the crosslinked aromatic polymeric binder includes a sufficient number of melamine rings and/or benzene rings such that the crosslinked aromatic polymeric binder has an aromaticity of between 40% and 60%. In other instances, the crosslinked aromatic polymeric binder is a crosslinked aromatic polyester binder having a sufficient number of melamine rings and/or benzene rings such that the crosslinked aromatic polyester binder has an aromaticity of between 10% and 40%. In yet other instances, the crosslinked aromatic polymeric binder is a crosslinked aromatic acrylic binder having sufficient melamine rings and/or benzene rings such that the crosslinked aromatic acrylic binder has an aromaticity of between 10% and 40%.

In some instances, the crosslinked polymeric binder is the only binder that is used in the fibrous insulation product. In other instances, the crosslinked polymeric binder is an additive that is applied to an additional binder. The fibrous insulation product may exhibit a degradation temperature greater than 500° Fahrenheit and an onset exothermic temperature greater than 550° Fahrenheit as measured on an exotherm plot. The crosslinked aromatic polymer binder may exhibit a flex modulus greater than 3.5 MPa and a tensile strength retention after humidity aging of greater than 70% as measured according to the dogbone test.

According to another aspect, a method of forming a fibrous insulation product includes providing a plurality of entangled fibers and mixing a highly aromatic multifunctional polyol with a polyfunctional acid. The mixed highly aromatic multifunctional polyol and polyfunctional acid are added to the plurality of entangled fibers and the entangled fibers are passed through an oven to react the highly aromatic multifunctional polyol with the acid to form a crosslinked aromatic polymeric binder that bonds the plurality of entangled fibers together and thereby forms a fibrous insulation blanket or board product. The highly aromatic multifunctional polyol and acid are applied so that the aromatic polymeric binder is present in the fibrous insulation blanket or board product in an amount of between 1 and 20 weight percent.

In some instances, the highly functional aromatic polyol is a nitrogen containing aromatic polyol. The highly aromatic multifunctional polyol may be a low molecular weight phenolic resin, melamine resin, and/or melamine-phenolic resin. The low molecular weight high aromatic phenolic resin, melamine resin, and/or melamine-phenolic resin may be ethoxylated or propoxylated so that the resin includes aliphatic hydroxyl end groups. In a specific instance, the low molecular weight high aromatic phenolic resin is a mono-ethoxylated novolac. In such instances, the mono-ethoxylated novolac may be reacted with a di-functional or multi-functional carboxylic acid to form a polyester.

In other instances, the highly aromatic multifunctional polyol is an epoxylated novolac. The epoxylated novolac may be pre-hydrolyzed to form a glycol that is reacted with a polycarboxylic acid. In yet other instances, the highly aromatic multifunctional polyol may have low ethoxylation and/or propoxylation. The polyfunctional acid may be a polyacrylic acid (PAA), citric acid, and/or maleic acid. The highly aromatic multifunctional polyol may be mixed with the polyfunctional acid in a mixing tank, or mixed inline, and the mixed highly aromatic multifunctional polyol and polyfunctional acid may be applied to the plurality of entangled fibers and reacted to form a highly crosslinked polyester binder.

According to another aspect, a method of forming a binder for a fibrous insulation product includes providing a highly aromatic multifunctional polyol and mixing a polyfunctional acid with the highly aromatic multifunctional polyol to react and form an aromatic polymeric binder. The highly aromatic multifunctional polyol may be a low molecular weight phenolic resin, melamine resin, and/or melamine-phenolic resin. In some instances, the method may also include alkoxylating the low molecular weight phenolic resin, melamine resin, and/or melamine-phenolic resin to form a novolac polyol, a melamine polyol, or a melamine-phenolic polyol. Alkoxylating the low molecular weight phenolic resin, melamine resin, and/or melamine-phenolic resin may include ethoxylating or propoxylating the low molecular weight phenolic resin. In a specific instance, the low molecular weight aromatic phenolic resin may be alkoxylated to form a mono-ethoxylated novolac. The mono-ethoxylated novolac may be mixed with a di-functional or multi-functional carboxylic acid to react and form a polyester.

In some instances, the highly aromatic multifunctional polyol is an epoxylated novolac. The epoxylated novolac may be pre-hydrolyzed to form a glycol that is mixed with a polycarboxylic acid and reacted to form a highly crosslinked polyester binder. In some instances, the highly aromatic multifunctional polyol may have a low alkoxy ethylene oxide/propylene oxide copolymer chain. In some instances, the method may further include reacting diethanolamine (DEA) with epoxidized bisphenol A or triglycidyl isocyanurate (TGIC), or other epoxy containing compounds, to form a multi-functional hydroxyl compound. To facilitate reaction of DEA with epoxies, the reaction is typically carried at 100-150 C for a period of 10-60 minutes until the epoxies are consumed. The polyfunctional acid may be polyacrylic acid (PAA), citric acid, or maleic acid. The highly aromatic multifunctional polyol may include only one or two ethoxy or propoxy units in the chain. The highly aromatic multifunctional polyol may have greater than 35% aromatic hydrocarbons. In such instances, the highly aromatic multifunctional polyol may be a modified polyol having between 35% and 60% aromatic hydrocarbons. In other instances, the highly aromatic multifunctional polyol may be an unmodified polyol having between 70% and 90% aromatic hydrocarbons.

BRIEF DESCRIPTION OF THE DRAWINGS

The present technology is described in conjunction with the appended figures:

FIGS. 2-7B illustrate exemplary polyols and aromatic binder compositions.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein relate to fibrous insulation products that include an aromatic polymeric binder that improves the thermal stability and mechanical properties of the fibrous insulation. For example, the fibrous insulation products may exhibit increased fire performance, compressive strength, and/or rigidity in comparison with conventional fibrous insulation products. The aromatic polymeric binder may be a polyester binder, a polyacrylic binder, and the like. Polyester binders refer to binders that are formed by reacting a polyol with a carboxylic acid to form a polyester. Polyacrylic binders refer to binders that are formed by reacting mixing a polyol with an acrylic acid to form a polyacrylate. The aromatic polymeric binders described herein are water soluble or, stated differently, are dispersible in aqueous solutions. The aromatic polymer binder described herein does not include furan based resin.

The embodiments described herein also relate to methods of forming an aromatic polymeric binder. The aromatic polymeric binder may be formed by combining a highly aromatic multifunctional polyol with a polyfunctional acid. The highly aromatic multifunctional polyol and polyfunctional acid are reacted to form the aromatic polymeric binder. The highly aromatic multifunctional polyol may be a low molecular weight phenolic resin, melamine resin, and/or melamine-phenolic resin and the polyfunctional acid may be a di-functional or multi-functional acid. Examples of low molecular weight aromatic polyols include novolac polyols, melamine polyols, melamine-phenolic polyols, and the like. The low molecular weight phenolic resin, melamine resin, and/or melamine-phenolic resin may be alkoxylated to make the resins more reactive. For example, the low molecular weight phenolic resins may be ethoxylated and/or propoxylated. In other instances, the low molecular weight phenolic resins may be epoxylated or hydrolyzed in order to make the resins more reactive. Examples of polyfunctional acids include polyacrylic acid, citric acid, maleic acid, and the like.

The highly aromatic multifunctional polyol and polyfunctional acid may be applied to a plurality of entangled fibers. These materials may be applied simultaneously or sequentially to the plurality of entangled fibers. In some embodiments, the highly aromatic multifunctional polyol and polyfunctional acid may be combined in a mixing tank, or mixed inline, and then applied to the entangled fibers simultaneously. In other instances, the highly aromatic multifunctional polyol and polyfunctional acid may be stored in separate tanks and applied to the entangled fibers either simultaneously or sequentially, typically by mixing the materials inline prior to application to the entangled fibers. After application of the highly aromatic multifunctional polyol and polyfunctional acid to the fibers, the entangled fibers are passed through an oven where a reaction between the highly aromatic multifunctional polyol and polyfunctional acid is initiated to form a crosslinked binder.

Fibrous Insulation Products

Figure 1:
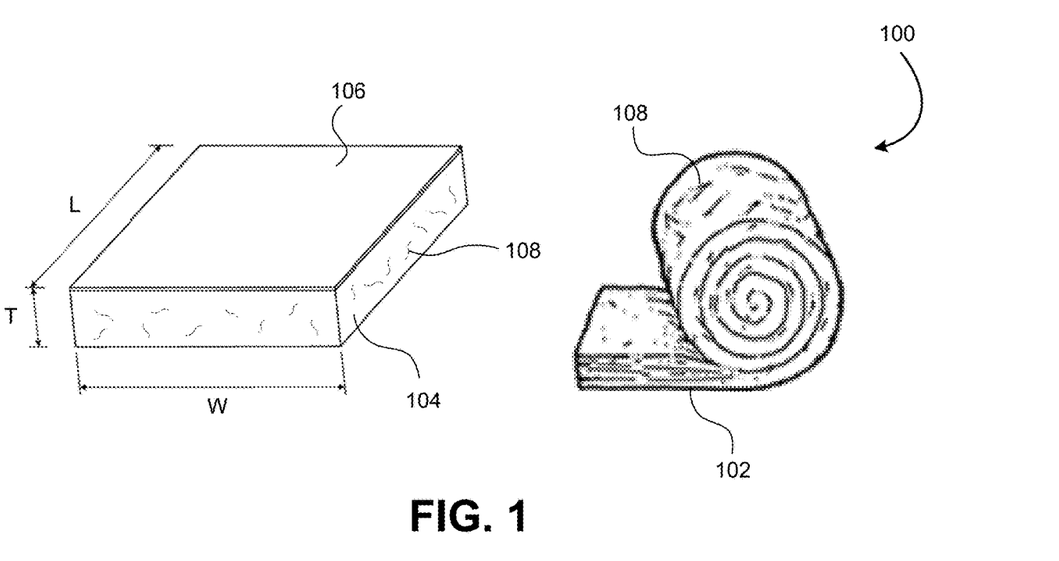
FIG. 1 illustrates embodiments of fibrous insulation products.

Referring now to FIG. 1, illustrated are embodiments of fibrous insulation products 100. The fibrous insulation products 100 may be a fibrous insulation blanket 102 or fiber board product 104. Fibrous insulation blankets 102 include blanket batts and rolls and fiber board products 104 include high and low density fiber boards, which may include a facer 106, one or more additives (not shown), scrim (not shown), reflective layers (not shown), and the like. The fibrous insulation blanket 102 may similarly include one or more facers (not shown), additives (not shown), scrim (not shown), reflective layers (not shown), and the like. The term "fibrous insulation product" refers generally to both fibrous insulation blankets 102 and fiber board product 104 unless otherwise specified herein.

The fibrous insulation product has a length L, a width W, and a thickness T. The length L is commonly between 45 and 1,500 inches and more commonly between 45 and 110 inches. The width W is commonly between 10 and 96 inches and more commonly between 11 and 30 inches. The thickness T is commonly between 2 and 18 inches and more commonly between 3 and 10 inches. These are exemplary values that can be varied based on the desired end product. The fibrous insulation product 100 has a density that is commonly between 0.2 and 10 pounds per cubic foot (pcf) and more commonly between 0.3 pcf and 3.0 pcf, or between 0.4 pcf and 1.5 pcf. Lower density insulation products, such as fibrous insulation blankets 102 may have a density of between 0.4 and 1.5 pounds per cubic foot (pcf), while higher density insulation products, such as fiber boards, have a density of between 0.75 and 6 pcf. The fibrous insulation product 100 may exhibit an R-value of between 4 and 50.

The fibrous insulation product 100 includes or consists of a plurality of fibers 108 that are entangled together and a crosslinked aromatic polymeric binder that bonds the entangled fibers 108. The fibers 108 may have an average fiber diameter of between 4 and 30 microns. In some instances, the fibrous insulation product may include a combination of fibers 108 includes smaller diameter fibers and larger diameter fibers. The fibrous insulation product 100 includes between 80 and 99 weight percent of the fibers and between 1 and 20 weight percent of the aromatic polymeric binder and more commonly between 2 and 10 weight percent of the aromatic polymeric binder. The aromatic polymeric binder may be more effective at bonding the fibers together in comparison with conventional binders, which may enable the fibrous insulation product 100 to include less binder material than conventional products. For example, in lower density insulation products, such as fibrous insulation blankets 102, the insulation product may include between 4.5 and 6.5 weight percent of the aromatic polymeric binder. In higher density insulation products, such as insulative fiber boards 104, the insulation product may include between 10 and 11 weight percent of the aromatic polymeric binder. The polymeric binder in the fibrous insulation product 100 typically never exceeds 20% by weight of the fibrous insulation product 100.

In some instances, the crosslinked aromatic polymeric binder may be highly aromatic. The term "highly aromatic" as used in reference to the polymeric binder means that the polymeric binder has an aromaticity of greater than 20%. As is known in the art, the percentage of aromaticity is the molecular weight percent of the aromatic portion of the molecule, such as a benzene ring, melamine ring, and the like. Stated differently, the aromaticity is the molecular weight the benzene ring or melamine ring as a percentage of the total molecular weight of the binder. In other instances, the highly aromatic polymeric binder may have an aromaticity of greater than 30%, 40%, 50%, or even 60%. Higher levels of aromaticity are preferred. The higher the aromaticity of the binder, the less modification (e.g., alkoxylation) of the polyol that may be required.

The aromaticity of the polymeric binder is dependent on the modification of the polyol and on the acid that is reacted with the polyol. In some instances, the polyol may be unmodified and may be reacted with an acid so that the resulting polymeric binder is a highly aromatic polymer binder having an aromaticity of between 20% and 60%, more commonly between 40% and 60%, and most commonly between 45% and 55%. For example, an unmodified phenolic resin, melamine resin, and/or melamine phenolic resin (see FIGS. 3, 5A, and 5B) can be reacted with citric acid, maleic acid, and/or polyacrylic acid. In another instance, the polyol may be modified (e.g., alkoxylated, epoxylated, and the like) and may be reacted with an acid so that the polymeric binder has an aromaticity of between 20% and 50%. For example, a modified melamine-phenolic polyol (see FIG. 2) can be reacted with citric acid and/or maleic acid to form an aromatic polyester binder. In another instance, the polyol may be modified and reacted with acrylic acid so that an aromatic acrylic or polyacrylate binder is produced having an aromaticity of between 20% and 40%. For example, modified polyols (see FIG. 2, 4A) can be reacted with polyacrylic acid to form a polyacrylate binder.

As described herein, the use of the aromatic polymeric binder enables the fibrous insulation product 100 to exhibit increased thermal stability (e.g., fire performance or resistance) in comparison with conventional insulation products. The use of the polyols or resins described herein result in a substantial number of melamine rings and/or benzene rings remaining in the polymeric binder, which results in the increased aromaticity of the polymeric binder in comparison with conventional fibrous insulation binders. The increased melamine rings and/or benzene rings result, in part, in the aromatic polymeric binder exhibiting the thermal and structural properties described herein. For example, the aromatic binder may have a degradation temperature greater than 500° Fahrenheit and an onset exothermic temperature greater than 550° Fahrenheit.

Figure 10:
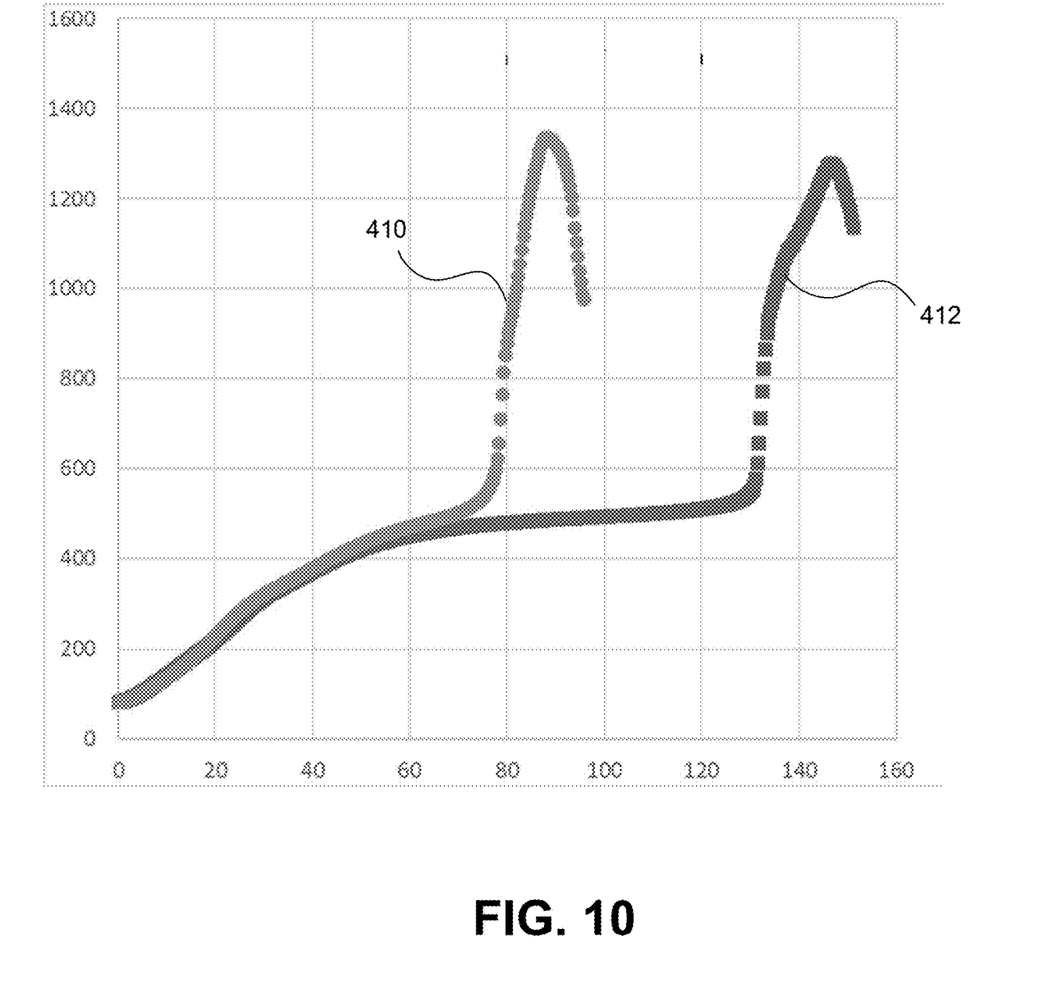
FIG. 10 illustrates an example exotherm plot.

The thermal stability measurements may be conducted by measuring temperatures of fiberglass insulation samples over time after they are placed in an oven. The most thermally stable samples will produce exotherm plots that show the sample climbing to the oven temperature and remaining there for the duration of the measurement time. Less thermally stable samples will exhibit a peak in the exotherm plot well above the oven temperature that indicates the sample has undergone thermal breakdown and the combustion of a cured binder has occurred. Based on exotherm plots of fiberglass insulation samples over time, the thermal stability of each sample could be quantified as the amount of elapsed time before an exothermic temperature peak was observed at a particular oven temperature and/or as a temperature at which an exothermic temperature peak is initiated. For example, FIG. 10 illustrates an example exotherm plot. Based on FIG. 10, sample 410 illustrates the onset of an exothermic temperature, in which the exothermic temperature was initiated at roughly 500° Fahrenheit. In contrast, sample 412 illustrates a fiberglass insulation sample that experienced exothermic temperature initiated at roughly 550° Fahrenheit, which represents a roughly 50 degrees increase in thermal stability in comparison with sample 410. Based on the exotherm plot of FIG. 10, it is evident that sample 410 is less thermally stable than sample 412.

The aromatic binder having an onset exothermic temperature greater than 550° Fahrenheit means that the onset of an exothermic peak of the aromatic binder would not occur on an exotherm plot until the fiberglass insulation sample reached a temperature of greater than 550° Fahrenheit.

The use of the aromatic polymeric binder also enables the fibrous insulation product 100 to exhibit increased mechanical properties, such as increased compressive strength and/or rigidity. For example, the increased compressive strength and/or rigidity of the aromatic polymeric binder may be exhibited and measured in a lab dog bone test, which is a test that is known in the art. In conducting such a test, dogbone-shaped samples may be made by combining an uncured binder (i.e., polyol and acid described herein) with borosilicate glass beads having an average diameter of 1 mm. The bead-binder composition amalgam may then be poured into dogbone molds roughly 25 mm wide and 6 mm thick and cured. Each dogbone sample may be tested in the same Instron tensile strength testing apparatus to measure its tensile strength (Harry W. Dietert Col.—Tensile Core Grip Assembly Part No. 610-7CA). When tested according to the dogbone test, the dogbone sample may exhibit a flex modulus greater than 3.5 MPa, which is attributable to the compressive strength and/or rigidity of the aromatic polymeric binder. The dogbone sample may also exhibit a tensile strength retention after humidity aging of greater than 70%, which is attributable to the compressive strength and/or rigidity of the aromatic polymeric binder. The tensile strength retention after humidity aging is defined as aged tensile strength and is a percentage of the original tensile strength of the material. Aged tensile strength may be measured using the Instron tensile strength testing apparatus descried above.

In some embodiments, the aromatic polymeric binder is a polyester material. The polyester material may be a nitrogen containing aromatic polyester. In other embodiments, the aromatic polymeric binder is a polyacrylic material. Example fibers that may be used in the fibrous insulation product 100 include fiberglass, mineral wool, and the like.

In some embodiments, the aromatic polymeric binder is the only binder that is used in bonding the fibers of the fibrous insulation product 100 together. Stated differently, the fibrous insulation product 100 may not include another binder other than the aromatic binder. In other embodiments, the fibrous insulation product 100 may include multiple binders, including the aromatic polymeric binder, or the aromatic polymeric binder may be an additive that is applied to a primary binder that bonds the fibers together. In some embodiments, the polyol portion of the aromatic polymeric binder consist of highly aromatic multi-functional polyols. In other embodiments, the polyol portion of the aromatic binder includes both highly aromatic multi-functional polyols and aliphatic polyols. The later embodiments could be utilized when a more flexible fibrous insulation product is desired, such as a fibrous insulation product having increased toughness.

Polymeric Binder

In forming the aromatic binder, a polyhydroxy material is mixed with a polycarboxy material. The resulting polymeric binder is preferably a polyester material or a polyacrylic material. The polyhydroxy material may be a highly aromatic multifunctional polyol while the polycarboxy material may be a polyfunctional acid. In some instances, the highly aromatic multifunctional polyol may be a low molecular weight phenolic resin, melamine resin, and/or melamine-phenolic resin. The polyhydroxy material (e.g., the highly aromatic multifunctional polyol) is composed mainly of aromatic hydrocarbons and little, or minimal, aliphatic hydrocarbons, which makes the resulting polymeric binder more thermally stable. In regard to unmodified polyols, the term "highly aromatic" means a polyol with an aromaticity of greater than or equal to 70% (see e.g., FIGS. 3 and 5B). When the polyol is modified in order to increase its reactivity, or for any other reason, the aromaticity of the polyol may decrease. In regard to modified polyols, the term "highly aromatic" means a polyol with an aromaticity of greater than or equal to 35%.

The polyol and acid are polyfunctional, which means that these materials have a hydroxy or carboxylic acid functionality of at least two. In some embodiments, the average functionality of the polyol is about two while the functionality of the acid is greater than or equal to two Typically, the polyol or acid can have a functionality greater than two in order to form a crosslinked binder. If both the polyol and acid have a functionally of 2, the resulting binder would be linear. In some embodiments, the highly aromatic multifunctional polyol may include only one or two ethoxy or propoxy units in the chain. When the modified polyol (i.e., novolac, melamine, melamine-phenolic) has one or two ethoxy and propoxy units, it may increase the reactivity of the polyol without significantly reducing the aromaticity of the polyol, which may result in increased thermal stability and rigidity of the binder. The high functionality of the polyol and acid result in a highly crosslinked polyester material being formed while ensuring that the resulting polyester material does not contain a long aliphatic chain moiety. Exemplary polyhydroxy materials include novolacs, melamines, melamine-phenolics, and the like. Exemplary polyfunctional acids include polyacrylic acid (PAA), carboxylic acid, citric acid, maleic acid, and the like. Additional exemplary polyfunctional acids that may be used are described herein.

The resulting aromatic polymeric binders are formaldehyde free binders. Although these binders are produced from one or more formaldehyde containing materials, the phenol content is significantly high in comparison with the formaldehyde content. Thus, the term "formaldehyde free" encompasses materials that are both free of formaldehyde as well as materials that include some minimal or negligible formaldehyde content.

For high aromatic phenolic resins, the hydroxyl group is directly attached to the benzene ring. The reactivity of such resins toward carboxylic acid is low due to the hydroxyl group being directly attached to the benzene ring. Because of this, such resins may need to be modified to enable the resins to be used in forming the polymeric binders described herein, and in particular polyester based binders. To modify the resin, the resin could be alkoxylated, such as through ethoxylation and/or propoxylation. In other instances, the resin could be epoxidized. Modifying the resin increases the reactivity of the resin and enables the resin to easily react with an acid to form the polymeric binder. Modifying the resin converts the aromatic hydroxyl into an aliphatic hydroxyl. The modification should be done in a manner so that the resin includes a relatively low alkoxylation chain length, such as one or two ethoxylation or propoxylation units. For example, it may be desirable to modify the resin (i.e., ethoxylated, propoxylated, and/or epoxidized resins) while ensuring that the aliphatic carbon is considerably lower than aromatic carbon. A modification of the resin in this manner produces a molecule in which the hydroxy groups are highly reactive.

Figure 3:
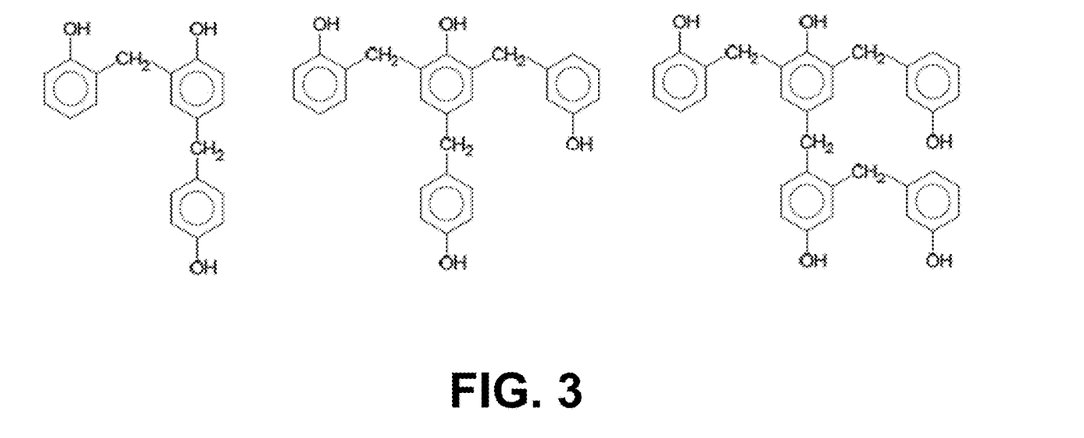
Figure 4A:
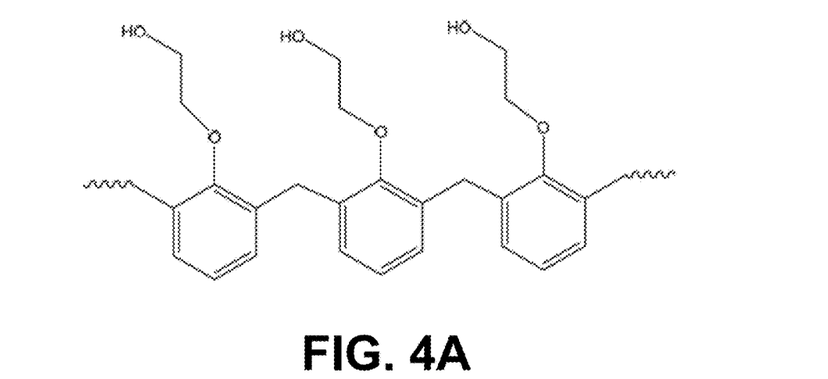

The aromaticity of the polyol is dependent on the type and amount of modification that is performed on the polyol. In some instances, it may be desirable to use unmodified polyol materials that have an aromaticity of between 70% and 90%. For example, low molecular weight novolac resins (e.g., see FIG. 3) have an aromaticity around 74%, while melamine-phenolic resins (e.g., see FIG. 5B) have an aromaticity of around 88%. In other instances, it may be desirable to modify the polyol so that the polyol has an aromaticity of between 30% and 60%. For example, the aromaticity of an alkoxylated melamine-phenolic resin (e.g., see FIG. 2) can range from 30% to 40% depending on the extent of ethoxylation/propoxylation. The aromaticity of the modified polyol of FIG. 4A is roughly 51%. The modified or unmodified polyol may then be reacted with an acid, which would result in a polymeric binder having an aromaticity as previously described.

Described below are exemplary polyols and resins, and exemplary methods of modifying such materials, for use in forming aromatic polymeric binders described herein.

The polyols and resins that are used to form the aromatic polymeric binders described herein are multi-functional low molecular weight molecules having a high aromatic content. These molecules can be used as the crosslinker/polyol when reacted with polyfunctional acids, such as polyacrylic acid (PAA), citric acid, maleic acid, and the like, to form the highly crosslinked thermoset binder for the fibrous insulation products 100. As described herein, the highly crosslinked thermoset binder can provide improved thermal stability and dimensional stability in comparison with conventional binders.

Figure 2:
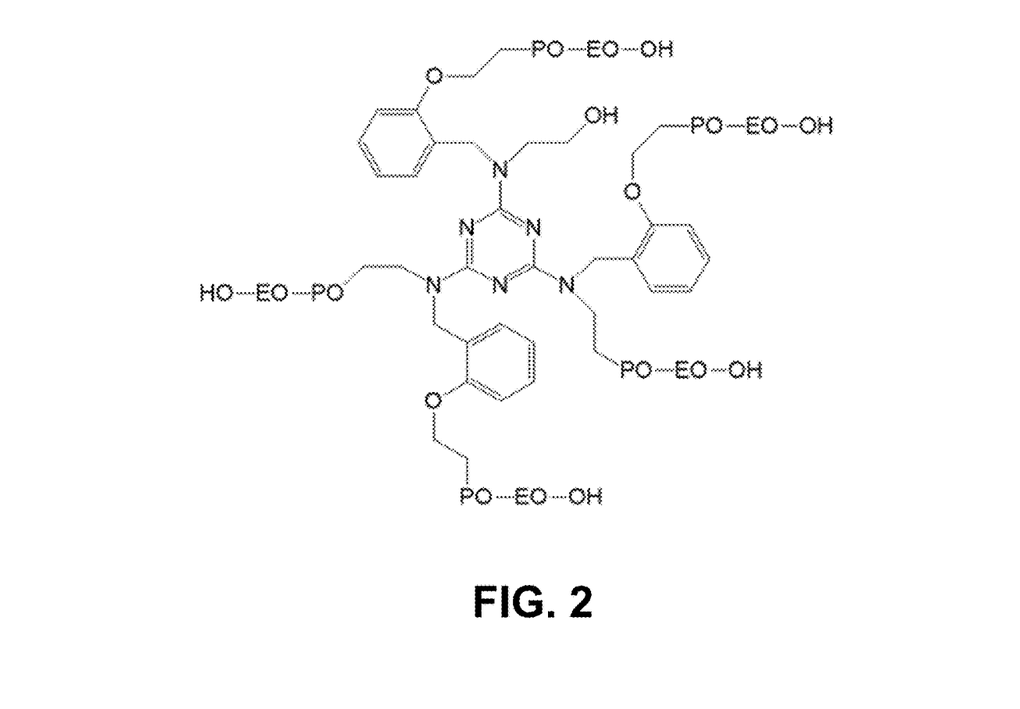

In some embodiments, these multifunctional low molecular weight high aromatic molecules can be alkoxylated (ethoxylated and/or propoxylated) to generate novolac polyol, melamine polyol, and melamine-phenolic polyol. In some embodiments, a length of the ethylene oxide/propylene oxide (EO/PO) chain may be controlled to achieve a desired thermal stability and dimension stability of the fibrous insulation product 100. Specifically, a polyol with low alkoxy (EO/PO) chain may be preferred in order to provide a combination of good reactivity and high thermal and dimension stability. An example of a polyol with low alkoxy (EO/PO) chain is illustrated in FIG. 2.

A specific polyol/resin that may be used to form aromatic polymeric binders are phenolic resins, which are condensation polymers of phenol and formaldehyde. A specific type of phenolic resin is a novolac, which is polymerized with excess of phenol in the presence of an acid catalyst and contains no remaining methylol group.

Because the novolac reaction is starved for formaldehyde, usually with a formaldehyde to phenol ratio of 0.75-0.85:1, only low molecular weight oligomers/polymers are formed. These low molecular weight oligomers/polymers, which are illustrated in FIG. 3, are solids at room temperature, but can be dissolved in a variety of solvents, including water, ethylene glycol, diethylene glycol, triethanolamine, triethyl phosphate (TEP), tris(2-chloro-isopropyl) phosphate (TCPP).

Novolacs can be reacted with ethylene/propylene oxide, or their corresponding glycols, to form the corresponding ethoxylated and/or propoxylated novolacs as illustrated in FIG. 4A. To form polyesters with improved thermal resistance, mono-ethoxylated novolacs (ethylene glycol novolac) may be preferred. The mono-ethoxylated novolacs can be mixed with di-functional or multi-functional carboxylic acids to form a highly aromatic binder, which may be applied to the substrate and crosslinked to form a polyester, which may be preferred for applications containing mineral, glass or organic fibers, such as for insulation, reinforcement composites, and the like.

Figure 4B:
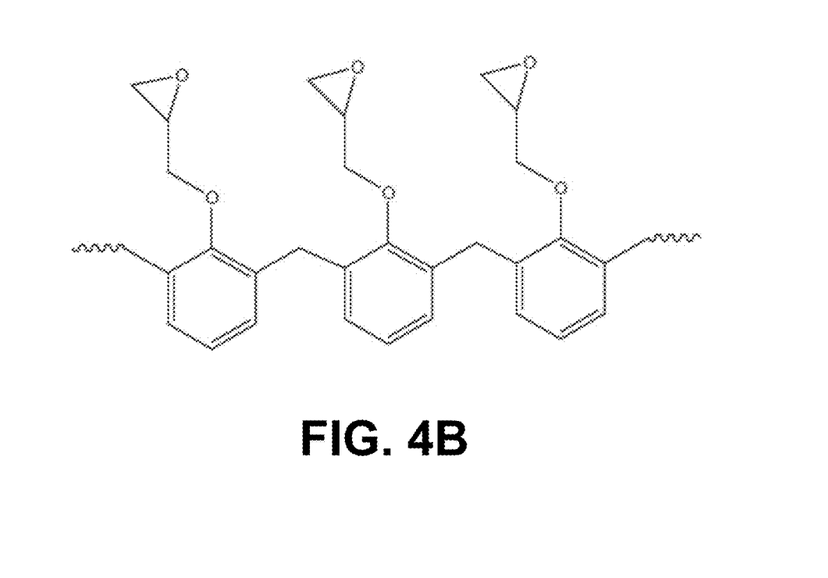
Figure 7A:
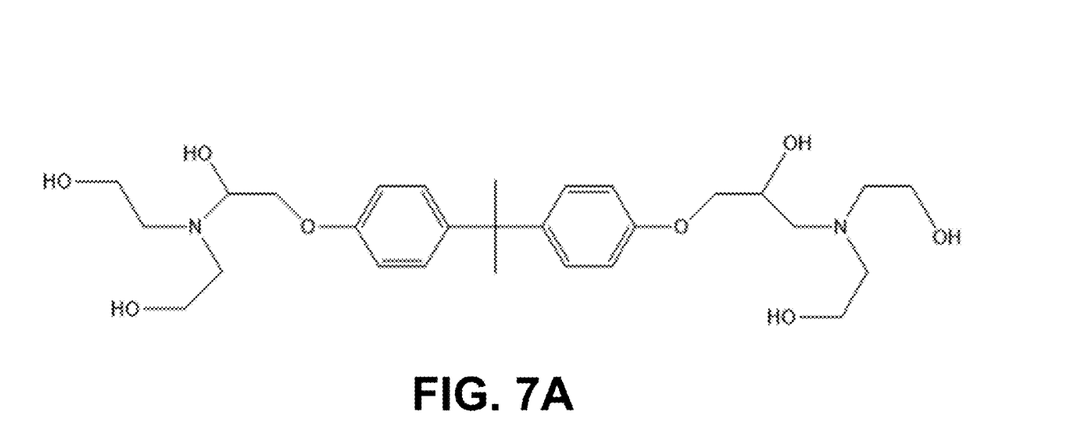
Figure 7B:
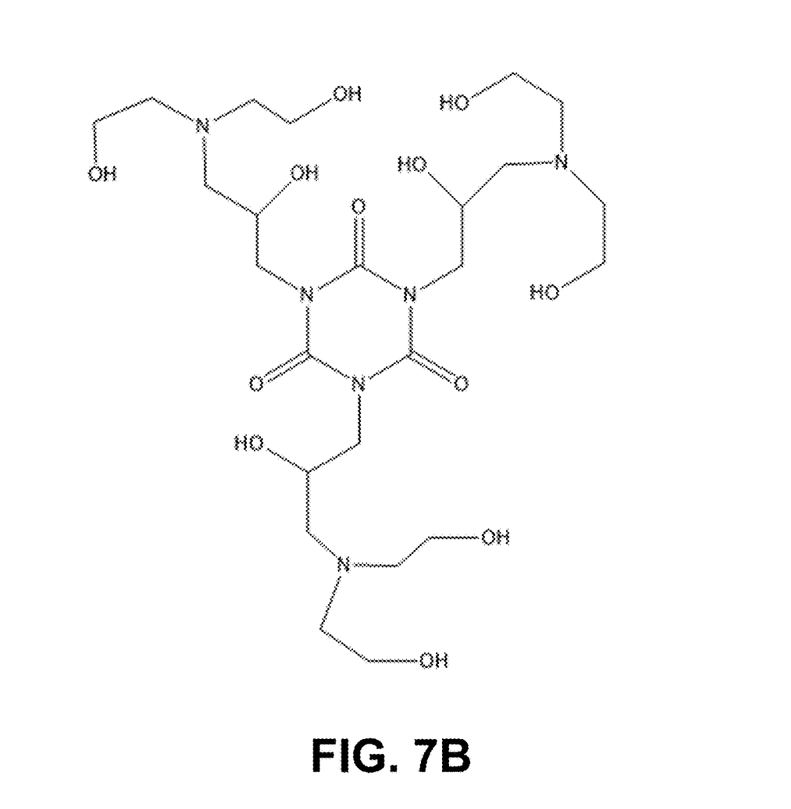

In other instances, a glycidyl novolac (e.g., epoxylated novolacs from reaction of novolacs with epichlorohydrin) derivatives can be reacted with polyfunctional carboxylic acids to form a thermally stable binder for the applications mentioned herein. As illustrated in FIG. 4B, the epoxylated novolacs can be pre-hydrolyzed to form corresponding glycols before being mixed with the polycarboxylic acids. In yet other instances, diethanolamine (DEA) may be mixed with epoxidized bisphenol A to form a multiple functional hydroxyl compound as illustrated in FIG. 7A. Alternatively, DEA may be mixed with triglycidyl isocyanurate (TGIC), or other epoxy containing compounds, to form a multiple functional hydroxyl compound as illustrated in FIG. 7B.

Figure 5A:
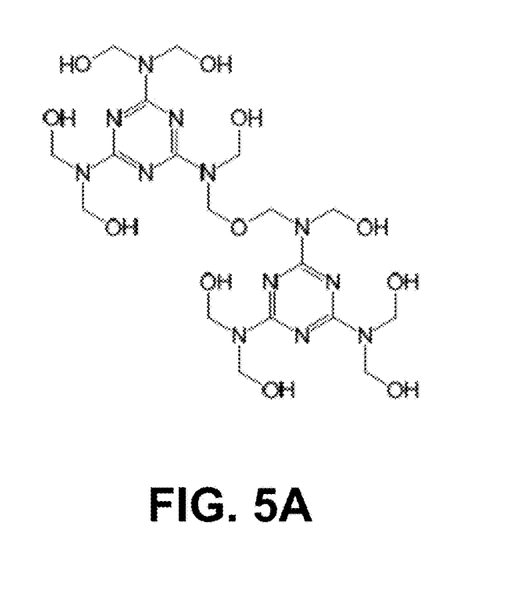
Figure 5B:
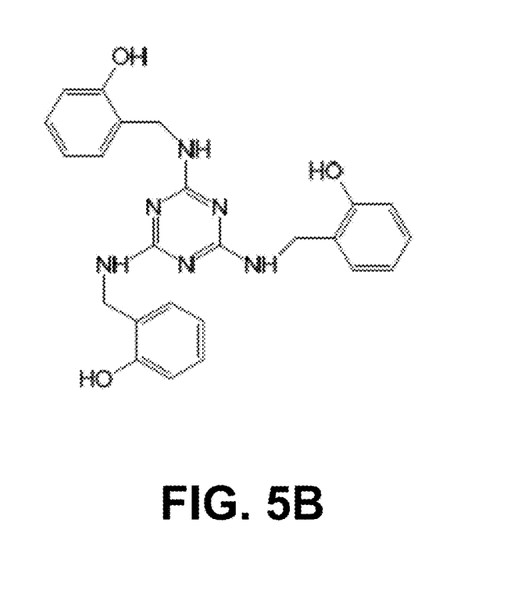

Melamine can polymerize with formaldehyde in a similar fashion as phenolic resin and form melamine formaldehyde resin, which is illustrated in FIG. 5A. Melamine and phenol can also co-polymerize with formaldehyde to form melamine-phenol-formaldehyde resin, which is illustrated in FIG. 5B.

Figure 6A:
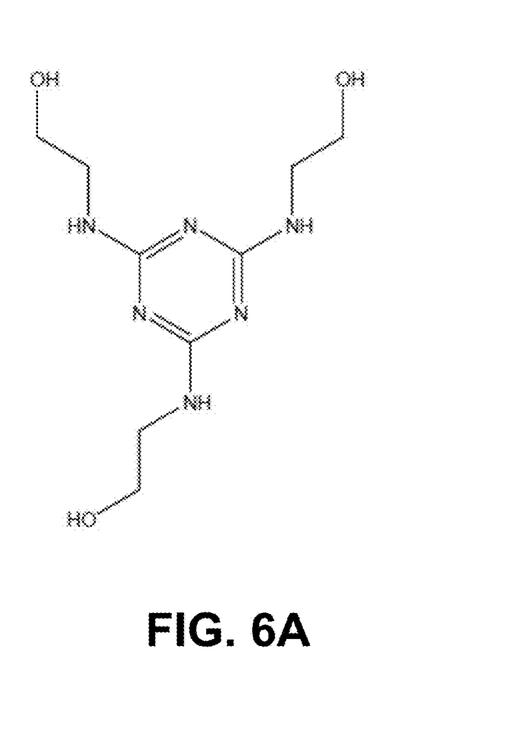
Figure 6B:
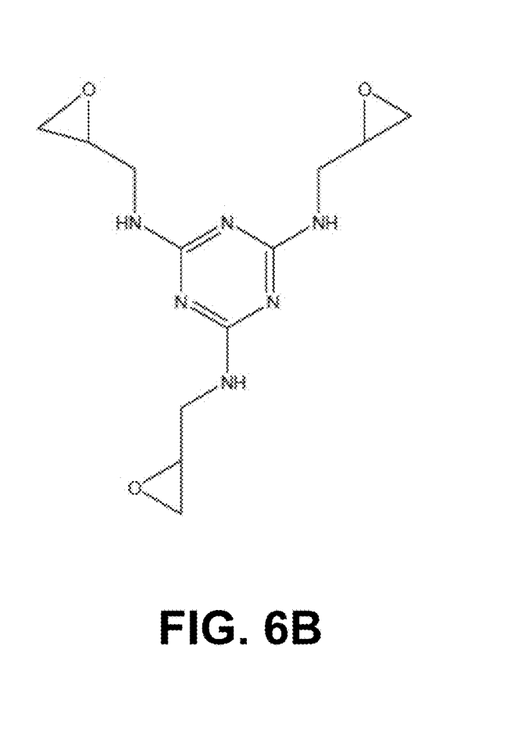

Another group of polyols that can provide enhanced thermal resistance to polyesters are ethoxylated/propoxylated melamine resins from reaction of melamine resins with ethylene/propylene oxide, which are illustrated in FIG. 6A. Similarly, either melamine or melamine-phenolic resin, which are illustrated in FIG. 6B, can be reacted with epichlorohydrin to form the corresponding epoxy resin, which can be reacted with multi-functional carboxylic acids to form a thermally stable binder. These epoxies can be prehydrolyzed to their corresponding polyols, or reacted with DEA, before mixing and/or before the esterification reaction.

Certain epoxidized compounds such as tri glycidyl isocyanurate (TGIC), either in epoxy form or post hydrolysis, can be utilized for reacting with multifunctional carboxylic acids to form thermally stable polyesters for use with fibrous insulation products 100. To reduce time and temperature of esterification, catalysts may be employed. For esterification of carboxylic acids with polyols, phosphorous-based catalysts such as phosphorous acid, sodium hypophosphite SHP, ammonium hypophosphite may be used. For reacting of carboxylic acids with epoxies, tertiary amines or phosphorous based catalysts such as triphenyl phosphene may be used.

The polyols described herein can also be used in conjunction with multi-functional hydroxyl containing molecules, such as triethanolamine, sorbitol, and low molecular weight starches.

Methods

Figure 8:
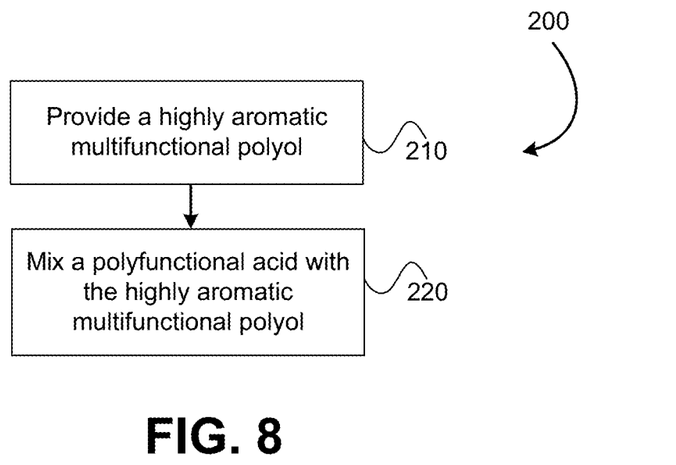
FIG. 8 illustrates a method of forming a binder for a fibrous product.

FIG. 8 illustrates a method 200 of forming a binder for a fibrous product, such as the fibrous insulation products 100 described herein. At block 210, a highly aromatic multifunctional polyol is provided. The highly aromatic multifunctional polyol may be any of the polyols or resins described or contemplated herein, or any equivalents thereof. At block 220, a polyfunctional acid is mixed and reacted with the highly aromatic multifunctional polyol to form an aromatic polymeric binder. The polyfunctional acid may be any of the acids described herein, or any equivalents thereof.

According to one embodiment, the highly aromatic multifunctional polyol is a low molecular weight phenolic resin. In such embodiments, the method may also include alkoxylating the low molecular weight phenolic resin to form a novolac polyol, a melamine polyol, or a melamine-phenolic polyol. Alkoxylating the low molecular weight phenolic resin may include ethoxylating and/or propoxylating the low molecular weight phenolic resin. In a specific embodiment, the low molecular weight high aromatic phenolic resin may be alkoxylated to form a mono-ethoxylated novolac. In such embodiments, the mono-ethoxylated novolac may be reacted with a di-functional or multi-functional carboxylic acid to form a polyester. This reaction may be carried out on glass or mineral fibers.

In another embodiment, the highly aromatic multifunctional polyol may be an epoxylated novolac. In such embodiments, the epoxylated novolac may be pre-hydrolyzed to form a glycol that is reacted with a polycarboxylic acid. The highly aromatic multifunctional polyol may have a low alkoxy ethylene oxide/propylene oxide copolymer chain. The highly aromatic multifunctional polyol may include, or consist of, one or two ethoxy or propoxy units in the chain. In some embodiments, the polyol may be unmodified and the hydrocarbons in the highly aromatic multifunctional polyol may include or consist of 70% or greater aromatic hydrocarbons. In some embodiments, the polyfunctional acid is a polyacrylic acid (PAA), a citric acid, a maleic acid, and the like.

Figure 9:
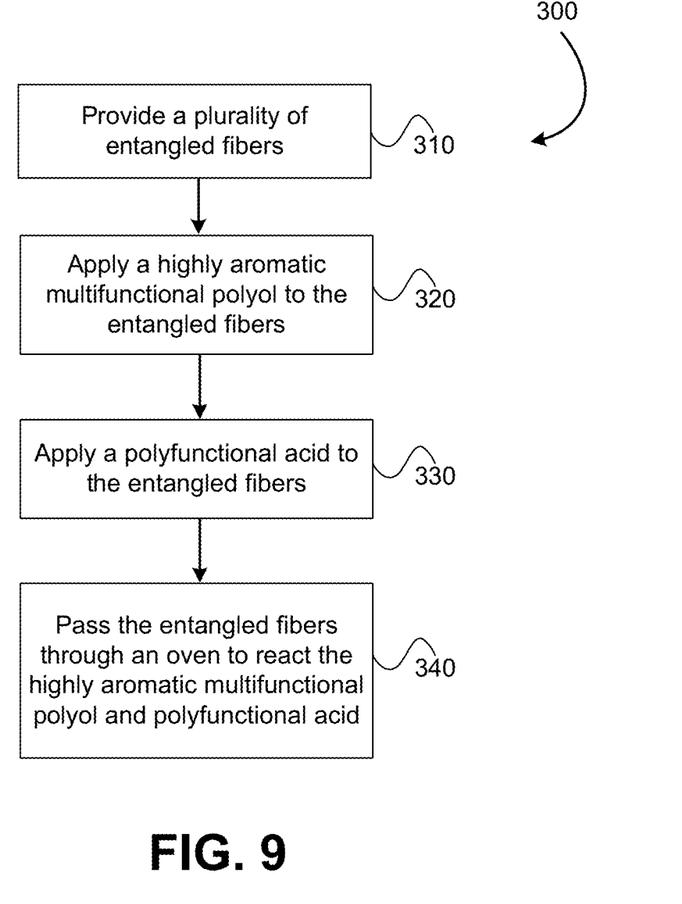
FIG. 9 illustrates a method of forming a fibrous insulation product.

FIG. 9 illustrates a method 300 of forming a fibrous insulation product. At block 310, a plurality of entangled fibers is provided. At block 320, a highly aromatic multifunctional polyol is applied to the plurality of entangled fibers. At block 330, a polyfunctional acid is applied to the plurality of entangled fibers. In some embodiments, the highly aromatic multifunctional polyol and polyfunctional acid are contained in a mixing tank and the method includes mixing the highly aromatic multifunctional polyol with the polyfunctional acid in the mixing tank. In such embodiments, the mixed highly aromatic multifunctional polyol and polyfunctional acid are simultaneously applied to the plurality of entangled fibers. In other embodiments, the highly aromatic multifunctional polyol and polyfunctional acid are stored in separate tanks. In such embodiments, the highly aromatic multifunctional polyol and polyfunctional acid may be mixed inline and applied simultaneously or applied sequentially to the entangled fibers.

At block 340, the entangled fibers are passed through an oven to react the highly aromatic multifunctional polyol with the polyfunctional acid to form a crosslinked aromatic polymeric binder that bonds the plurality of entangled fibers together and thereby forms a fibrous insulation blanket or board product. In some embodiments, the highly aromatic multifunctional polyol and acid are applied so that the aromatic polymeric binder is present in the fibrous insulation blanket or board product in an amount of between 1 and 20 weight percent. In some embodiments, the highly functional aromatic polyol is a nitrogen containing aromatic polyol.

In some embodiments, the highly aromatic multifunctional polyol is a low molecular weight phenolic resin. The low molecular weight phenolic resin may be alkoxylated to form a novolac polyol, a melamine polyol, or a melamine-phenolic polyol. For example, the low molecular weight high aromatic phenolic resin may be ethoxylated and/or propoxylated so that the resin includes aliphatic hydroxyl end groups. In a specific embodiment, the low molecular weight highly aromatic phenolic resin is a mono-ethoxylated novolac. In such embodiments, the mono-ethoxylated novolac is mixed with a di-functional or multi-functional carboxylic acid, which may then be applied to the glass or mineral wool to react and form a crosslinked polyester binder.

In some embodiments, the highly aromatic multifunctional polyol is an epoxylated novolac. In such embodiments, the epoxylated novolac is pre-hydrolyzed to form a glycol that is reacted with a polycarboxylic acid. In some embodiments, the highly aromatic multifunctional polyol has a low alkoxy ethylene oxide/propylene oxide copolymer chain. The polyfunctional acid may include or consist of polyacrylic acid (PAA), citric acid, maleic acid, or any other acid described herein.

The highly aromatic multifunctional polyol and polyfunctional acid may be applied so that the binder content in the fibrous insulation product 100 does not exceeds 20% by weight. In some instances, reacting the highly aromatic multifunctional polyol and polyfunctional acid may result in the formation of water, especially when the highly aromatic multi-functional polyol is prehydrolyzed. Passing the entangled fibers through the oven to react these materials results in the water being evaporated from the entangled fibers. In some embodiments, ethylene carbonate and/or propylene carbonate can react with novolac, melamine, and/or melamine-phenolic resin in a similar way as ethylene oxide/propylene oxide. In such instances, the end product would be the same as those described herein. In some embodiments, the highly aromatic multifunctional polyol has low ethoxylation and/or propoxylation. This may be desired so that fewer than all the available hydroxy are converted to ethoxy or propoxy, which minimizes the chain length of the highly aromatic multifunctional polyol.

EXAMPLES

As described herein, in some instances it may be preferred to react an unmodified polyol with an acid to form a highly aromatic polymeric binder. The highly aromatic polymeric binder formed according to this process may have a substantial amount of benzene and/or melamine rings and may have an aromaticity of between 40% and 60%. For example, the unmodified polyol illustrated in FIG. 5B may be used as the polyol, which has an aromaticity of approximately 88%. This polyol may be reacted with an aliphatic acid, such as citric acid, to form a highly aromatic polyester binder having an aromaticity of approximately 60%. Similarly, the phenolic based resin illustrated in FIG. 3 may be reacted with an acid, such as citric acid, to form a highly aromatic polyester binder having an aromaticity of roughly 45%.

In other instances it may be preferred to react a modified polyol or resin with an acid to form an aromatic polymeric binder. The aromatic polymeric binder formed according to this process may have sufficient benzene and/or melamine rings so that the resulting aromatic polymeric binder has an aromaticity of between 20% and 40%. The polymeric binder may be an acrylic binder or a polyester binder. For example, the polyol (e.g., novolac resin, melamine resin, or melamine-phenolic resin) may be alkoxylated to introduce aliphatic hydroxyls, which reduces the aromaticity of the polyol. The modified polyol may then be reacted with a multifunctional acid (e.g., polyacrylic acid, maleic acid, etc.) to form the aromatic polymeric binder having an aromaticity of between 20% and 40%. Other polyols may be reacted with other acids to form the aromatic polymeric binder.

Additional polycarboxylic acids that may be used as a polymerization reactant are described herein. Exemplary polycarboxylic acids may include at least one polycarboxylic acid selected from the group consisting of citric acid, oxalic acid, maleic acid, succinic acid, adipic acid, itaconic acid, malic acid, butane tetracarboxylic acid, phthalic acid, isophthalic acid, terephthalic acid, trimellitic acid, pyromellitic acid, and benzophenone tetracarboxylic acid, among other polycarboxylic acids. The polycarboxylic acids are normally monomeric polycarboxylic acids. In some instances, they may be oligomerized to form oligomeric polycarboxylic acids (e.g., oligomers made up of 2 to 10 monomer units). The polycarboxylic acids may include polyacrylic acids. They may also include copolymers of carboxylic acids and vinyl compounds, such as styrene maleic acid, and styrene maleamic acid, among other copolymeric polycarboxylic acid compounds. They may further include an anhydride form of the copolymeric acids, such as styrene maleic anhydride.

In some embodiments, the binder compositions may include a coupling agent that strengthens the bonding between the binder and the fibers. Exemplary coupling agents include silane coupling agents that include a silicon-containing moiety and an organic moiety. The silicon-containing moiety may be an organo-silane group, and more specifically a hydrolysable silyl group represented by Si—(OR)m where n represents 1, 2 or 3, and "OR" represents an alkoxy group such as a methoxy and/or ethoxy group. The organic moiety may be reactive or unreactive in forming covalent chemical bonds with the polymers of the binder. Examples of reactive organic moieties include vinyl groups, epoxy groups, amino groups, methacryloxy groups, mercapto groups, etc. Examples of unreactive organic moieties include alkyl groups and aryl groups, among others. More specific examples of coupling agents include amino-propyl triethoxy silane, glycidoxy propyl triethoxy silane, isocyanate tri-ethoxy silane, mercapto propyl triethoxy silane, vinyl triethoxy silane, acryloxy propyl triethoxy silane, propyl triethoxy silane, and 3-(glycidoxypropyl) methyldiethoxysilane among other silane compounds. When a coupling agent is added, it's typically added at a level of 0.1 wt. % to 2 wt. % of the dry weight of the binder composition.

The binder compositions may include a cure catalyst (i.e., polymerization catalyst) to speed the rate of reaction and/or lower the reaction temperature of the polymerization reaction between the polyol and polycarboxylic acid reactants. Exemplary cure catalysts include alkali metal phosphate salts such as sodium hypophosphite (SHP). Exemplary cure catalysts may also include phosphorous- and/or sulfur-containing salts of metals such as titanium, zirconium, zinc, and tin, among other metals. When a cure catalyst is added, it is typically added at a level of 1 wt. % to 10 wt. % of the dry weight of the binder composition. Additional concentration ranges include 1 wt. % to 5 wt. %; 2 wt. % to 5 wt. %; 3 wt. % to 5 wt. % and 4 wt. % to 5 wt. %.

The binder compositions may also include anticorrosion agents. Exemplary anticorrosion agents may include sodium nitrite, zinc sulfate, zinc nitrite, starnnous sulfate, stannous chloride, dicyandiamide (DICY), sodium metaborate and ammonium pentaborate, among others. Additional examples of anticorrosion agents include calcium borosilicate, strontium and zinc phosphosilicates, and triethanol amine/diethanol amine phosphate. When an anticorrosion agent is added to the binder composition, it is typically added at a level of 1 wt. % to 10 wt. % of the dry weight of the binder composition. Additional concentration ranges include 1 wt. % to 5 wt. %; and 1 wt. % to 2.5 wt. %.

The binder compositions may also include one or more added crosslinking agents. Exemplary added crosslinking agents may include compounds having two or more moieties capable of reacting with the reactants and/or the polymerized reaction products in the binder composition. These crosslinking moieties may include hydroxyl groups and carboxyl groups, among other moieties. Crosslinking agents may include compounds with a single type of crosslinking moiety (i.e., two or more carboxyl groups) as well as compounds with at least two different types of crosslinking moieties (i.e., a carboxyl group and a hydroxyl group). The crosslinking agents may be added in mole ratios that range from 0.1:1 to 1:1 relative to the number of moles of the polycarboxylic acid and/or polyol reactants. Additional mole ratios of the crosslinking agent to the polycarboxylic acid may include 0.25:1 to 0.5:1.

Crosslinking agents may include polyaldehyde and polyketone compounds. For example, crosslinking agents may include dialdehyde compounds like glyoxal, that includes two aldehyde groups covalently bonded at the carbonyl carbons. Each of these carbonyl carbons is capable of independently reacting with reactive moieties on the polymerized reaction products to crosslink them. The additional crosslinking can enhance the properties of the cured binder in a variety of ways, including an increase in crosslinking density, an increase in tensile strength, an increase in rigidity of a fiber-containing batt, an increase in the recovery of a fiber-containing insulation batt, among other properties.

Crosslinking agents may also include polymeric emulsions and low molecular weight polyols. Exemplary polyols include glycerol, sorbitol, and triethanolamine, among others. In some instances, the crosslinking agent may also have functionality as a plasticizer in the binder, and/or a viscosity modifier in the binder composition that enables its easier handling and application.

The binder composition may also include one or more dedusting oils that help reduce abrasion and fiber breakage by lubricating the surfaces of the fiber so that less fiber dust is generated. The dedusting oils are also tacky fluids that help hold broken fibers, and other particulates in the composite, to prevent them from escaping into the surrounding environment, such as going airborne. Dedusting oils may include mineral oils and vegetable oils, among other types of oil. Dedusting oil may be included in the binder composition at levels of 0.1 wt. % to 1 wt. % of the final binder composite. Additional concentration ranges include 0.1 wt. % to 0.8 wt. %; and 0.1 wt. % to 0.5 wt. %, among other ranges.

Dedusting Agents may be applied to the binder composite. Exemplary dedusting agents include polyols, such as glycol and glycerol. They may also include polyether compounds such as polyethylene glycol ("PEG"), polypropylene glycol ("PPG"), and glycerol polyethers, among other polyether compounds. The polyether compounds may have a size range of 2000 g/mol or less, 1000 g/mol or less, 2000 g/mol to 500 g/mol, and 200 g/mol to 1000 g/mol, among other ranges. In some instances, the dedusting agent may be applied to the binder composite without a solvent (i.e., neat), while in additional instances the dedusting agent is mixed with a solvent to meet a target viscosity (e.g., 600 to 200 cSt at 75° F.). Exemplary solvents include water. They also include organic soluble electrolytes such as calcium acetate, lithium acetate, amine acetates (e.g., triethanolamine acetate), and sodium benzoate, among others. Exemplary solvents further include combinations of water and organic soluble electrolytes.

The binder composition may also include one or more additives that do not participate as polymer reactants in the binder. These exemplary additives may include biocides, adhesion promoters, oxygen scavengers, solvents, emulsifiers, pigments, organic and/or inorganic fillers, flame retardants, anti-migration aids, coalescent aids, wetting agents, plasticizers, anti-foaming agents, colorants, waxes, suspending agents, antioxidants, among other components. When an additive is added to the binder composition, it is typically added at a level of 0.5 wt. % to 10 wt. % of the dry weight of the binder composition. Additional concentration ranges include 0.5 wt. % to 5 wt. %; and 0.5 wt. % to 2.5 wt. %.

In some instances, the additives are pre-mixed with the binder composition before it is applied to fibers and cured. In additional instances, the additives may be introduced to the curable, curing, and/or cured fiber-containing composite during or after the initial binder composition is applied to the fibers.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of forming a fibrous insulation product, the method comprising:
   providing a plurality of entangled fibers;
   mixing a highly aromatic multifunctional polyol with a polyfunctional acid;
   applying the mixed highly aromatic multifunctional polyol and polyfunctional acid to the plurality of entangled fibers;
   passing the entangled fibers through an oven to react the highly aromatic multifunctional polyol with the acid to form a crosslinked aromatic polymeric binder that bonds the plurality of entangled fibers together and thereby forms a fibrous insulation blanket or board product;
   wherein the highly aromatic multifunctional polyol and acid are applied so that the aromatic polymeric binder is present in the fibrous insulation blanket or board product in an amount of between 1 and 20 weight percent.

2. The method of claim 1, wherein the highly functional aromatic polyol is a nitrogen containing aromatic polyol.

3. The method of claim 1, wherein the highly aromatic multifunctional polyol is a low molecular weight phenolic resin, melamine resin, melamine-phenolic resin.

4. The method of claim 3, wherein the low molecular weight phenolic resin, melamine resin, melamine-phenolic resin is alkoxylated to form a novolac polyol, a melamine polyol, or a melamine-phenolic polyol.

5. The method of claim 4, wherein the low molecular weight high aromatic phenolic resin, melamine resin, melamine-phenolic resin is ethoxylated or propoxylated so that the resin includes aliphatic hydroxyl end groups.

6. The method of claim 5, wherein the low molecular weight high aromatic phenolic resin is a mono-ethoxylated novolac, and wherein the mono-ethoxylated novolac is reacted with a di-functional or multi-functional carboxylic acid to form a polyester.

7. The method of claim 1, wherein the highly aromatic multifunctional polyol is an epoxylated novolac.

8. The method of claim 7, wherein the epoxylated novolac is pre-hydrolyzed to form a glycol that is reacted with a polycarboxylic acid.

9. The method of claim 7, wherein the epoxylated novolac is pre-reacted with alkanol amine to form a polyol that is reacted with a polycarboxylic acid.

10. The method of claim 1, wherein the highly aromatic multifunctional polyol has low ethoxylation and/or propoxylation.

11. The method of claim 1, wherein the polyfunctional acid is polyacrylic acid (PAA), citric acid, or maleic acid.

12. The method of claim 1, wherein the highly aromatic multifunctional polyol is mixed with the polyfunctional acid in a mixing tank or mixed inline.

13. A method of forming a binder for a fibrous insulation product, the method comprising:
    providing a highly aromatic multifunctional polyol; and
    reacting a polyfunctional acid with the highly aromatic multifunctional polyol to form an aromatic polymeric binder.

14. The method of claim 13, wherein the highly aromatic multifunctional polyol is a low molecular weight phenolic resin, melamine resin, and/or melamine-phenolic resin.

15. The method of claim 14, wherein the method further comprises alkoxylating the low molecular weight phenolic resin, melamine resin, and/or melamine-phenolic resin to form a novolac polyol, a melamine polyol, or a melamine-phenolic polyol.

16. The method of claim 15, wherein alkoxylating the low molecular weight phenolic resin, melamine resin, and/or melamine-phenolic resin comprises ethoxylating or propoxylating the low molecular weight phenolic resin.

17. The method of claim 15, wherein the low molecular weight high aromatic phenolic resin is alkoxylated to form a mono-ethoxylated novolac.

18. The method of claim 17, wherein the mono-ethoxylated novolac is reacted with a di-functional or multi-functional carboxylic acid to form a polyester.

19. The method of claim 13, wherein the highly aromatic multifunctional polyol is an epoxylated novolac.

20. The method of claim 19, wherein the epoxylated novolac is pre-hydrolyzed to form a glycol that is reacted with a polycarboxylic acid.

21. The method of claim 13, wherein the highly aromatic multifunctional polyol has a low alkoxy ethylene oxide/propylene oxide copolymer chain.

22. The method of claim 13, further comprising reacting diethanolamine (DEA) with epoxidized bisphenol A or triglycidyl isocyanurate (TGIC) to form a multi-functional hydroxyl compound.

23. The method of claim 13, wherein the polyfunctional acid is polyacrylic acid (PAA), citric acid, or maleic acid.

24. The method of claim 13, wherein the highly aromatic multifunctional polyol includes only one or two ethoxy or propoxy units in the chain.

25. The method of claim 13, wherein the highly aromatic multifunctional polyol has greater than 35% aromatic hydrocarbons.

26. The method of claim 25, wherein the highly aromatic multifunctional polyol is a modified polyol having between 35% and 60% aromatic hydrocarbons.

27. The method of claim 25, wherein the highly aromatic multifunctional polyol is an unmodified polyol having between 70% and 90% aromatic hydrocarbons.

* * * * *